(12) United States Patent  (10) Patent No.: US 8,517,533 B2
Razin  (45) Date of Patent: Aug. 27, 2013

(54) EYEWEAR WITH REMOVEABLE SECURED ADJUSTABLE STRAP

(76) Inventor: Mark Razin, Laguna Beach, CA (US)

( * ) Notice: Subject to any disclaimer, the term of this patent is extended or adjusted under 35 U.S.C. 154(b) by 228 days.

(21) Appl. No.: 12/971,975

(22) Filed: Dec. 17, 2010

(65) Prior Publication Data

US 2012/0154738 A1    Jun. 21, 2012

(51) Int. Cl.
     *G02C 3/00*      (2006.01)
(52) U.S. Cl.
     USPC .......................................... 351/156; 351/157
(58) Field of Classification Search
     USPC ................... 351/156, 157, 123, 111, 158, 41, 351/116; 2/452
     See application file for complete search history.

(56) References Cited

U.S. PATENT DOCUMENTS

| | | | |
|---|---|---|---|
| 3,673,610 A * | 7/1972 | Liautaud | 2/452 |
| 4,761,068 A * | 8/1988 | Star | 351/156 |
| 4,976,531 A | 12/1990 | Kahaney | |
| 5,002,381 A | 3/1991 | Murrell | |
| 5,353,378 A * | 10/1994 | Hoffman et al. | 704/272 |
| 5,406,340 A * | 4/1995 | Hoff | 351/156 |
| 5,511,251 A | 4/1996 | Brakas | |
| 5,760,868 A | 6/1998 | Jannard et al. | |
| 5,786,882 A * | 7/1998 | Satterthwaite | 351/156 |
| 5,790,230 A | 8/1998 | Sved | |
| 5,801,805 A | 9/1998 | Mage | |
| 5,926,855 A | 7/1999 | Brodbeck | |
| 6,092,897 A * | 7/2000 | Smerdon, Jr. | 351/157 |
| 6,247,811 B1 | 6/2001 | Rhoades et al. | |
| 6,379,003 B1 * | 4/2002 | Seong | 351/63 |
| 6,428,167 B1 | 8/2002 | Leonardi | |
| 6,481,025 B2 | 11/2002 | Hill | |
| 6,588,899 B2 | 7/2003 | Pierotti | |
| 6,629,760 B1 * | 10/2003 | Razin | 351/156 |
| 6,692,124 B2 | 2/2004 | Katz et al. | |
| 6,758,562 B1 | 7/2004 | Barnette et al. | |
| 6,905,206 B2 | 6/2005 | Skuro | |
| 7,131,167 B2 | 11/2006 | Stagnaro | |
| 7,159,978 B2 | 1/2007 | Skuro | |
| 7,478,906 B2 | 1/2009 | Fielding, Jr. | |
| 7,661,816 B2 * | 2/2010 | Tsai | 351/123 |
| 7,665,840 B2 | 2/2010 | Winningham | |
| 2002/0144336 A1 | 10/2002 | Montague | |
| 2004/0174492 A1 | 9/2004 | Scherer | |
| 2006/0126008 A1 | 6/2006 | Olney | |
| 2007/0236654 A1 | 10/2007 | Skuro | |
| 2010/0064422 A1 | 3/2010 | Dichiara | |
| 2010/0091238 A1 | 4/2010 | Stanley et al. | |
| 2010/0110365 A1 | 5/2010 | Welchel et al. | |
| 2010/0272304 A1 | 10/2010 | Thiel et al. | |

FOREIGN PATENT DOCUMENTS

| | | |
|---|---|---|
| CN | 201408295 | 2/2010 |
| FR | 2934379 | 1/2010 |
| WO | 96/24315 | 8/1996 |
| WO | 97/33190 | 3/1997 |
| WO | 99/49351 | 9/1999 |
| WO | 01/74277 | 10/2001 |
| WO | 2007/084311 | 7/2007 |
| WO | 2008/109849 | 9/2008 |

* cited by examiner

*Primary Examiner* — Hung Dang
(74) *Attorney, Agent, or Firm* — Fish & Associates, PC (57) ABSTRACT

An eyewear assembly for engaging in water sports and other activities that expose the wearer to turbulent conditions. The eyewear assembly has a frame, a lens, two earstems, and a removeable and secured adjustable strap. The earstems have soft ends for coming in contact with the wearer's head. The removeable strap is securely fastened to the soft ends via two fasteners.

13 Claims, 10 Drawing Sheets

EYEWEAR WITH REMOVEABLE SECURED ADJUSTABLE STRAP

FIELD OF THE INVENTION

The field of the invention is eyewear, more specifically, eyewear assemblies for securely fastening eyewear to the user's head, for use during water sports and other athletic activity where abrupt turbulence is encountered.

BACKGROUND

Eyewear has been known for a long time and has been used to correct vision, protect the eyes from sunlight, protect the eyes from harmful objects and environments, and other various uses. Those who use eyewear often engage in sports and physical activities that require the athlete to perform in a dynamic and disruptive environment. For example, a surfer must endure breaking waves and a river kayaker must confront harsh white water turbulence. These turbulent conditions can cause the athlete's eyewear to fall off, which may result in reduced vision, lack of eye protection, and permanent loss of an expensive pair of glasses.

Athletes who require vision correction will frequently wear contact lenses. Unfortunately, bacteria in beaches and lakes can make contact lenses unsafe for athletes engaging in water sports because the bacteria from the water can accumulate in the lenses and cause various eye problems. Contact lenses are also undesirable during water sports because they can be easily washed out of the eye or forced out of position by the water. Thus, there is a need for eyewear that can be worn while engaging in water sports and other activities that involve exposure to extreme weather.

Various fasteners and straps have been used with eyewear in order to securely fasten eyewear to a user's head. However, various drawbacks still remain in existing eyewear assemblies, as discussed below.

Many prior art exist for underwater goggles for providing a water-tight and air-tight seal with the user's face when submerged under water. U.S. Pat. No. 5,926,855 to Brodbeck, U.S. Pat. No. 6,247,811 to Rhoades, and U.S. Pat. No. 6,588,899 to Pierotti are examples of such underwater goggles. While these goggles may prove useful for swimming and scuba diving, they are not well suited for water sports that generally occur above water or non-submerged water sports for various reasons. First, underwater goggles can be extremely uncomfortable since they apply a constant pressure to the eye sockets and head in order to maintain a seal. This seal is unnecessary when surfing, wind surfing, water skiing, kayaking and engaging in other various water sports because the athlete does not require underwater viewing. Second, the air-tight and water-tight seal can lead to fogging, which impedes vision. Third, the elastic straps used with underwater goggles introduces "play," meaning that the strap can stretch under turbulent conditions, causing the goggles to shift, twist, and fill with water. The trapped water impedes vision as well. Thus, underwater goggles are not well suited for non-submerged water sports that involve turbulent conditions.

Protective goggles and glasses for protecting the eyes from harmful objects and substances are also well known. U.S. Pat. No. 7,665,840 to Winningham teaches protective goggles for playing lacrosse and US Patent Application Publication 2010/0091238 to Stanley teaches air-tight protective goggles for machinists. These protective goggles suffer from the same limitations as the underwater googles, namely, they are uncomfortable due to the constant pressure to the head and eyes, and can shift and twist due to the "play" of the elastic straps.

Various eyewear assemblies have been specifically designed for surfing and water sports. International Application Publication WO 97/33190 to Webster, for example, teaches a pair of sunglasses with a strap for securing the sunglasses to the user's face. The sunglasses are specifically designed to withstand dislodging from windy sailboat rides and turbulent waters experienced by surfers. While Webster does provide a pair of sunglasses that securely fastens to the user's face, the sunglasses and strap assembly is overly complex and very uncomfortable.

Figure 1A:
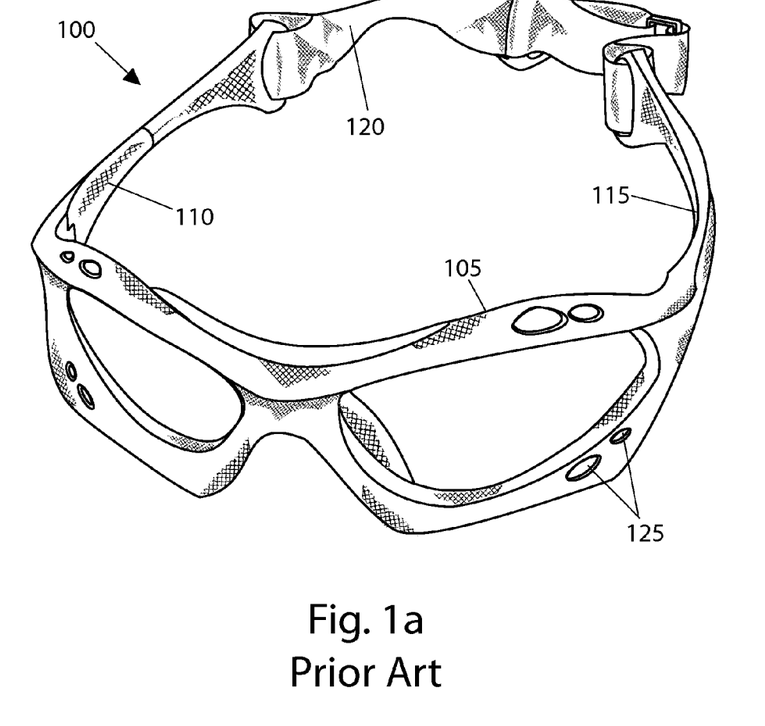
FIG. 1a is a perspective view of a prior art eyewear assembly.

Other eyewear and strap assemblies for use during water sports include those sold at various websites such as, <www.silverfish.com>, <www.wearsurfglasses.com>, <www.seaspecs.com>, and <www.oakley.com>. FIG. 1, for example, shows the SilverFish® "Standard" model sunglasses. Unlike the underwater goggles previously discussed, the "Standard" model utilizes a non-elastic strap, thus minimizing "play" in the eyewear assembly. This configuration advantageously reduces the feeling of constant pressure to the eye sockets, nose, and head of the user. Moreover, this configuration avoids the problems of fogging and trapped water between the eyes and eyewear. The "Standard" model also uses a soft material at the "contact points" (e.g. nose bridge, earstem tips), thus providing a comfortable fit. However, the "Standard" model fails to provide a mechanism in which the strap can be removeable to allow use for both sports and non-sports uses.

Removeable straps for eyewear are taught in International Application Publication WO 96/24315 to Barr and US Patent Application Publication 2004/0174492 to Scherer. The eyewear assemblies taught in Barr and Scherer have an elastic strap that can be completely removed and replaced with earstems. When the strap is attached the eyewear functions as underwater goggles, and when the earstems are attached the eyewear can be used for casual and social purposes. While this versatility may be useful, the eyewear in Barr and Schere still suffer from all the disadvantages of underwater goggles when used for surfing and other non-submerged water sports that do not require an air-tight seal.

Figure 2A:
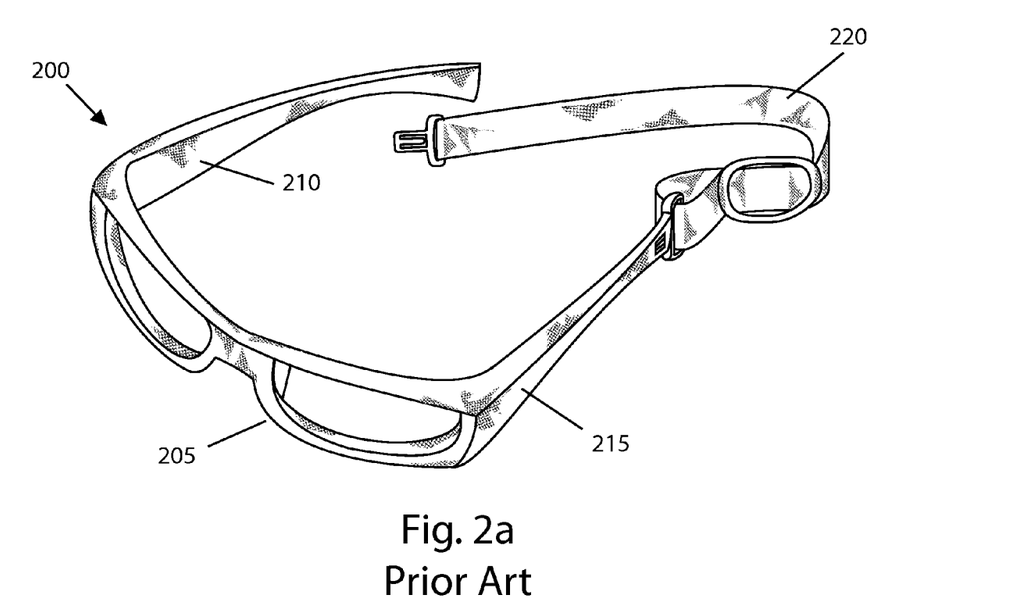
FIG. 2a is a perspective view of a prior art eyewear assembly.

A sunglasses design with a removeable strap is also sold by SilverFish®. The design is called the "S-Rat" model and is shown in FIG. 2. The "S-Rat" design provides a non-elastic removeable strap that securely fastens to the tip of the earstems. While this design successfully achieves "dual functionality" (it can be used during water sports or as a casual pair of sunglasses), the earstem tips can be uncomfortable as they are made from a hard material, as it was not appreciated that secure fasteners can be attached to soft materials. As used herein the term "soft" means a material generally made of rubber, silicon, gel, plastic or any other polymers that have the characteristics of being bendable without breaking.

U.S. Pat. No. 6,629,760 to Applicant, Razin, teaches an eyewear assembly with two rigid earstems and slots at the ends. A removeable strap having a hook-and-loop fastener can be fed through the slots, allowing the eyewear to be securely fastened to the wearer's head. By utilizing "restrict points" on the user's head and face, this particular eyewear configuration eliminates the need for a complex strap assembly. The eyewear in Razin also eliminates the need for an elastic strap, thus avoiding the uncomfortable application of a constant pressure to the wearer's eyes and head. However, the Applicant failed to appreciate the use of a soft material for the earstem ends until the Applicant appreciated the present inventive subject matter.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

Thus, there is still a need for an eyewear and removeable strap assembly that is simple, comfortable, and securely fastens to a user's head.

SUMMARY OF THE INVENTION

The inventive subject matter provides apparatus, systems and methods in which an eyewear assembly for a user has a frame for holding a lens, and two earstems. Each earstem has a soft end with a receiving portion. The receiving portion is configured to receive fasteners on a strap for removeably attaching the strap to the earstems. The strap is preferably made of a non-elastic material.

The frame has a nose bridge that is preferably made of a soft material. In one embodiment, the nose bride has two ridges that engage a portion of the user's eye sockets and sides of the nose, thus reducing movement of the eyewear assembly when external forces are applied.

Each of the two fasteners have at least a first dimension that allows the fasteners to pass through an opening of the receiving portion. Once the fasteners have passed through the opening of the receiving portion, a second dimension of the fasteners prevents the fasteners from passing back through the opening. The fasteners are coupled to the strap such that the second dimension naturally impedes the fasteners from passing through the opening unless a user specifically orients and aligns the fasteners to the opening and pushes the fasteners through the opening.

The eyewear assembly is preferably designed such that a space exists between the frame and user's face when the eyewear is worn by the user. In this manner, water may pass through the space, reducing external forces on the eyewear when used during water sports, and preventing water from getting trapped between the frame and eyes.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1b is a close-up side view of the earstem and strap of the prior art eyewear assembly in FIG. 1a.

FIG. 2b is a close-up side view of the earstem and strap of the prior art eyewear assembly in FIG. 2a.

DETAILED DESCRIPTION

In FIG. 1a, prior art sunglasses 100 sold by SilverFish® (Standard" model) is shown. Sunglasses 100 has a frame 105, earstems 110 and 115, and a non-removeable strap 120. Frame 105 has holes 125 for air ventilation and to combat fogging. Strap 120 has an adjuster 130 for adjusting the length of the strap 120.

Figure 1B:
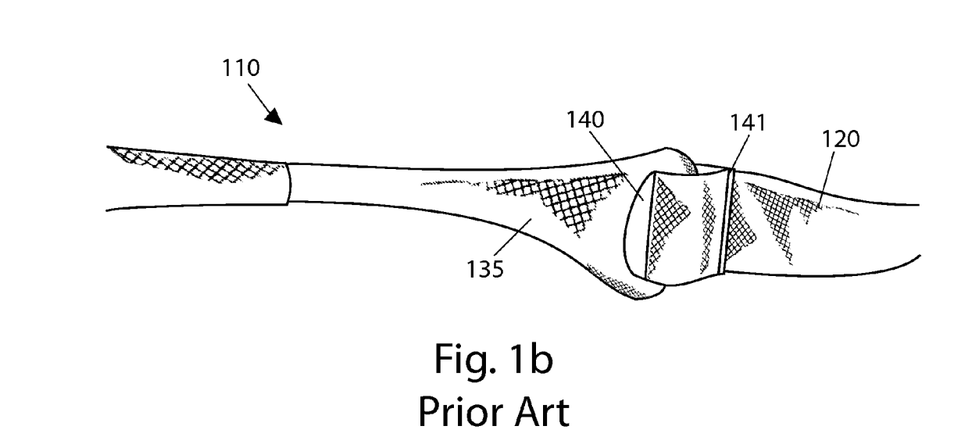

FIG. 1b shows a close-up of earstem 110 and strap 120. Earstem 110 has a soft end 135 made of an elastomer. Soft end 135 has a receiving portion 140 comprising an opening. Strap 120 is made of a non-elastic fabric. Strap 120 is permanently attached to receiving portion 140 via a stitched seam 141. As used herein, "permanent" means not easily removed or not intended to be removed.

Figure 2B:
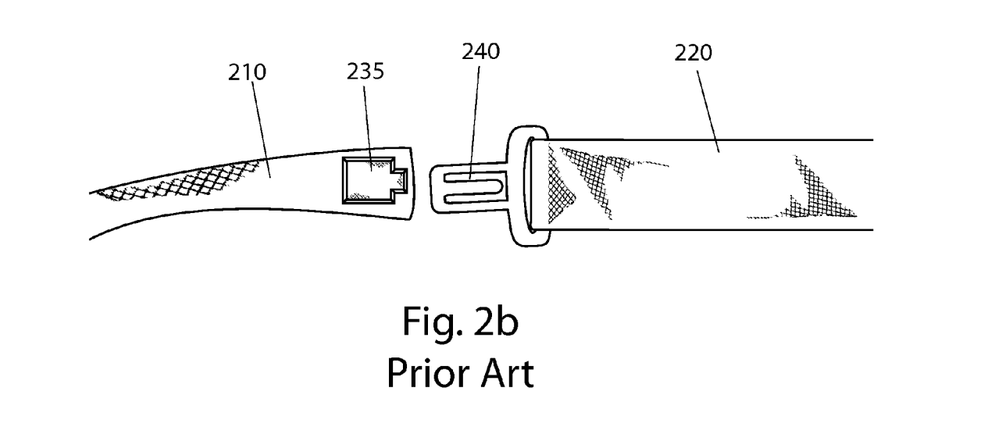

FIG. 2a shows prior art sunglasses 200 sold by SilverFish® ("S-Rat" model). Sunglasses 200 has a frame 205, earstems 210 and 215, and removeable strap 220. FIG. 2b shows a close-up of earstem 210. Earstem 210 is made of a hard plastic and, unlike earstem 110, does not have a soft end for coming into contact with the user's head. Earstem 210 has a receiving portion 235 for receiving a fastener 240 of strap 220. Fastener 240 enters the end of earstem 210 and snaps securely into place via receiving portion 235. Fastener 240 can be removed from earstem 210 by pressing on fastener 240 and pulling fastener 240 from earstem 210. Fastener 240 and receiving portion 235 allow strap 220 to be removed when sunglasses 200 is used for "casual" purposes (i.e. during activities that do not require the sunglasses to be securely fastened to the user's face and head).

Figure 3:
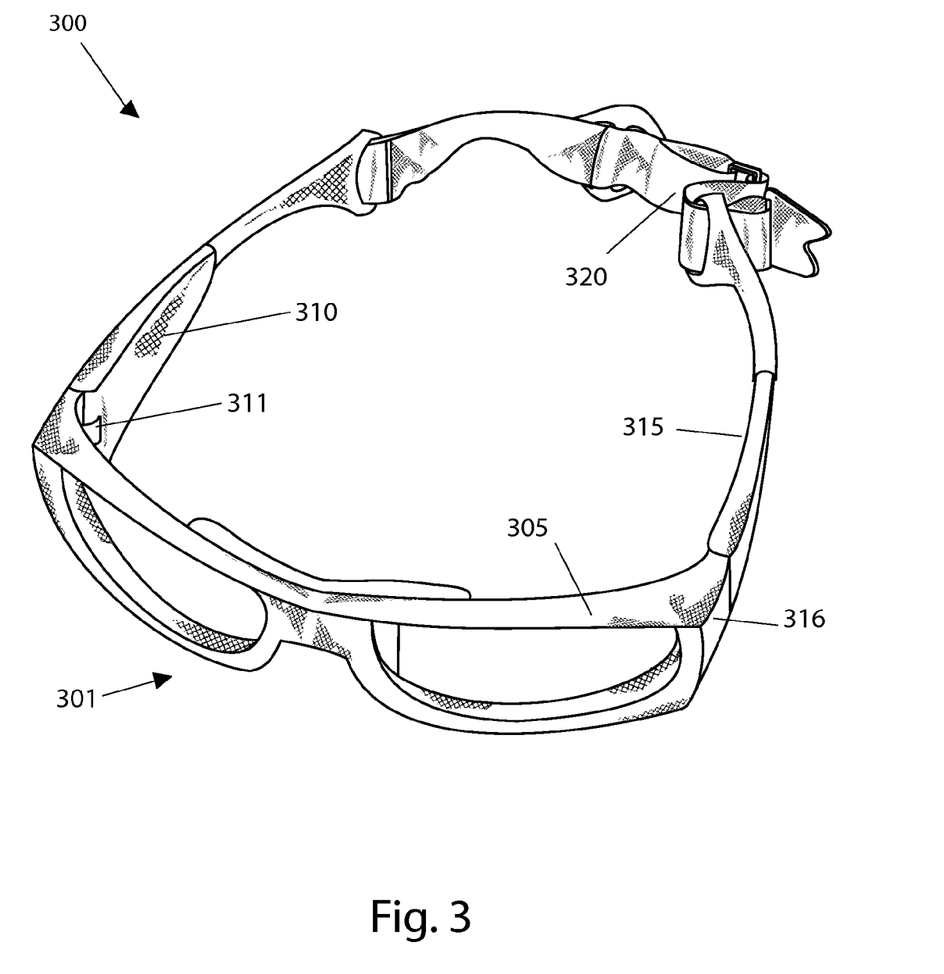
FIG. 3 is a perspective view of one embodiment of an eyewear assembly.

FIG. 3 shows one embodiment of the present invention. Eyewear assembly 300 comprises: (i) a sunglasses portion 301 having a frame 305 and earstems 310 and 315, and (ii) a removeable strap 320. Eyewear assembly 300 can be worn while the user is engaged in various sports, such as; surfing, body surfing, windsurfing, water polo, river kayaking, basketball, skiing, jet skiing, snowboarding, biking, mountain biking, racquetball, skydiving, paragliding, tennis, hiking, and jogging. Eyewear assembly 300 can also be worn during extreme weather conditions, such as high winds, rain, and snow storms.

Frame 305 is configured to hold two lenses. However, frame 305 could be adapted to hold one large lens covering both eyes of the user, or could hold a plurality of small lenses. The lenses can provide protection from ultraviolet light and can also include a prescription. Lenses for protecting the user's eyes from harmful objects are also contemplated. Lenses for eyewear are well known and all lens types are contemplated.

Frame 305 is preferably made of a material suitable for withstanding forces experienced during water sports. Hard plastics, metals, and composites are specifically contemplated, although any commercially available material suitable for use as eyewear is contemplated. In one embodiment, the frame is made of a polymer that can be used in an injection molding process.

Earstems 310 and 315 are hingeably connected to frame 305 via hinges 311 and 316, respectively. Hinges 311 and 316 allow earstems 310 and 315 to fold inward, allowing eyewear assembly 300 to be compactly stored when not in use. Hinges 311 and 316 can comprise a metal screw through a hinge point on the earstem and frame. Hinges 311 and 316 are preferably made of high strength materials in order to reduce chances of breakage at the hinge points.

It is also contemplated that earstems 310 and 315 and frame 305 could comprise one solid and integral component. In this manner, hinges 311 and 316 would be eliminated, as well as the possibility of failure at the hinge points. In one embodiment, frame 305 and earstems 310 and 315 are formed by one molding process.

Figure 4A:
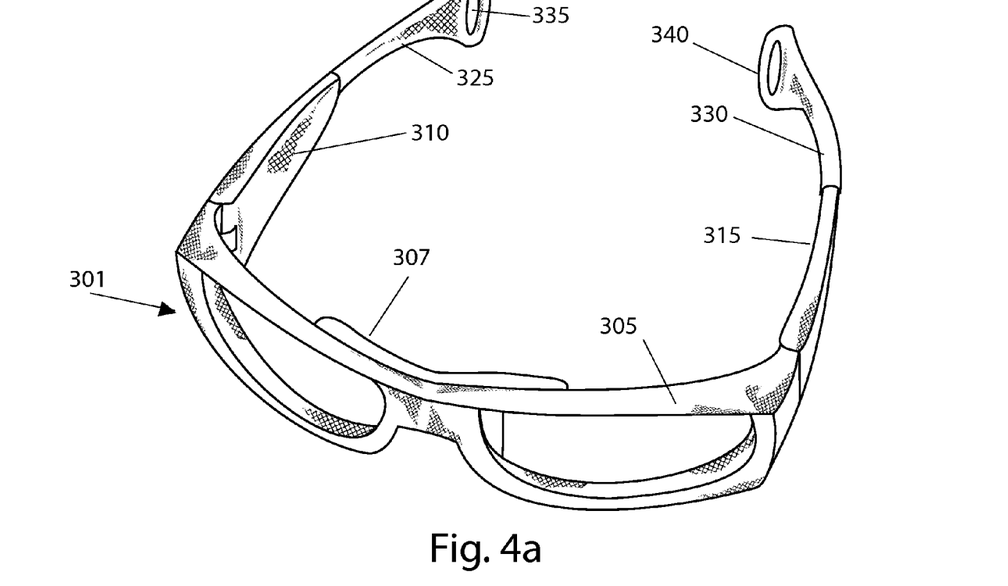
FIGS. 4a-4b show front and back perspective views of the eyewear assembly of FIG. 3.
Figure 4B:
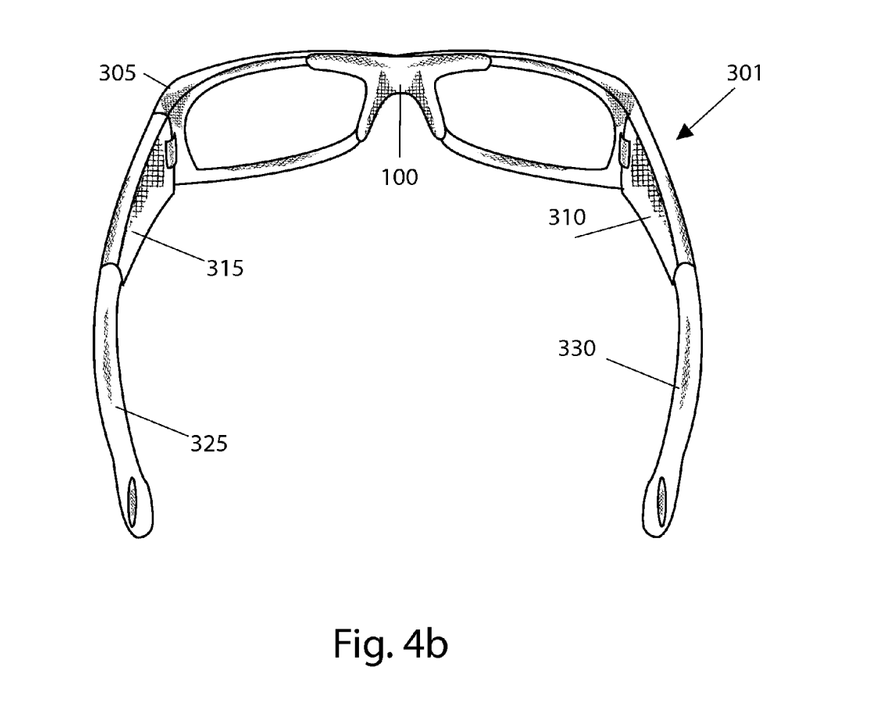
Figure 5:
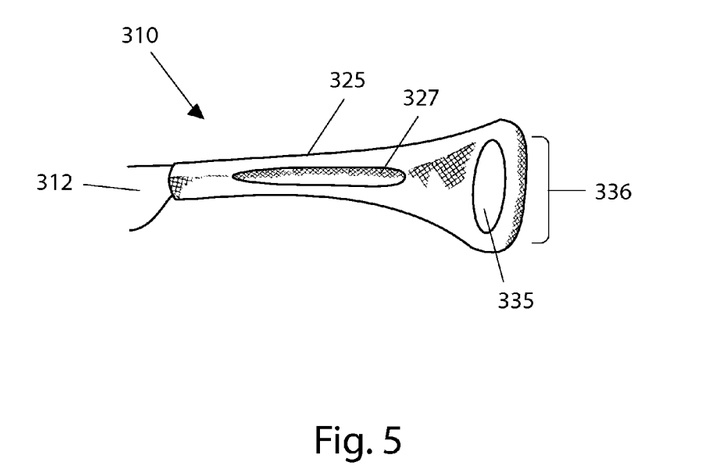
FIG. 5 is a close-up side view of an earstem of the eyewear assembly of FIG. 3.

FIGS. 4a and 4b show front and back perspective views of sunglasses portion 301, respectively, with strap 320 completely removed. FIG. 5 is a close-up of earstem 310. Earstem 310 has a rigid portion 312, a soft end 325, and a receiving portion 335. Soft end 325 is preferably made of an elastomer in order to provide comfort when contacting the wearer's head. Rigid portion 312 provides strength and rigidity in order to withstand turbulent conditions. Soft end 325 attaches to rigid portion 312 by extending over an end of rigid portion 312 in a sleeve-like configuration. Protrusion 327 shows where rigid portion 312 and soft end 325 overlap. In another embodiment, soft end 325 is attached to rigid portion 312 via an adhesive or by mechanical means, or in combination with the sleeve configuration shown in FIG. 5. Receiving portion 335 comprises an opening having a length 336. Receiving portion 335 shown in FIG. 5 is intended merely as a non-limiting example and one of ordinary skill in the art will appreciate that other geometries and sizes of the opening of receiving portion 335 are consistent with the inventive concepts discussed herein.

Earstem 310 can be designed to accommodate the contours of a head and wrap around the back of the head, such as that taught in U.S. Pat. No. 6,758,562 to Barnette. Earstem 310 can also be configured with multiple openings as taught in Barnette, allowing the user to choose the opening most comfortable and suitable for the user's particular needs.

Figure 6:
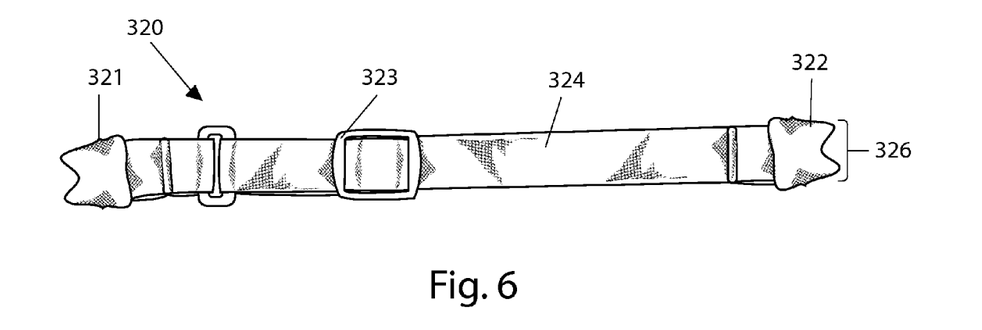
FIG. 6 is a close-up view of the strap of the eyewear assembly of FIG. 3.

FIG. 6 is a close-up of the adjustable secured strap 320. Strap 320 comprises a non-elastic fabric band 324 and an adjuster 323 for adjusting the length of strap 320. Strap 320 also has a fastener at each end, fasteners 321 and 322. Fastener 322 is shown to have a width 326, which is substantially similar to length 336 of receiving portion 335. In one preferred embodiment, receiving portion 335 is made of an elastic material, allowing length 336 to elongate slightly when a force is applied. Thus, width 326 of fastener 322 can be pushed through receiving portion 335, even when width 326 is slightly longer than length 336. Fasteners 321 and 322 have a tapered length in order to facilitate pushing the fasteners through the receiving portion. Fasteners 321 and 322 also have a v-shaped end in order to better accommodate protrusion 327.

Figure 7A:
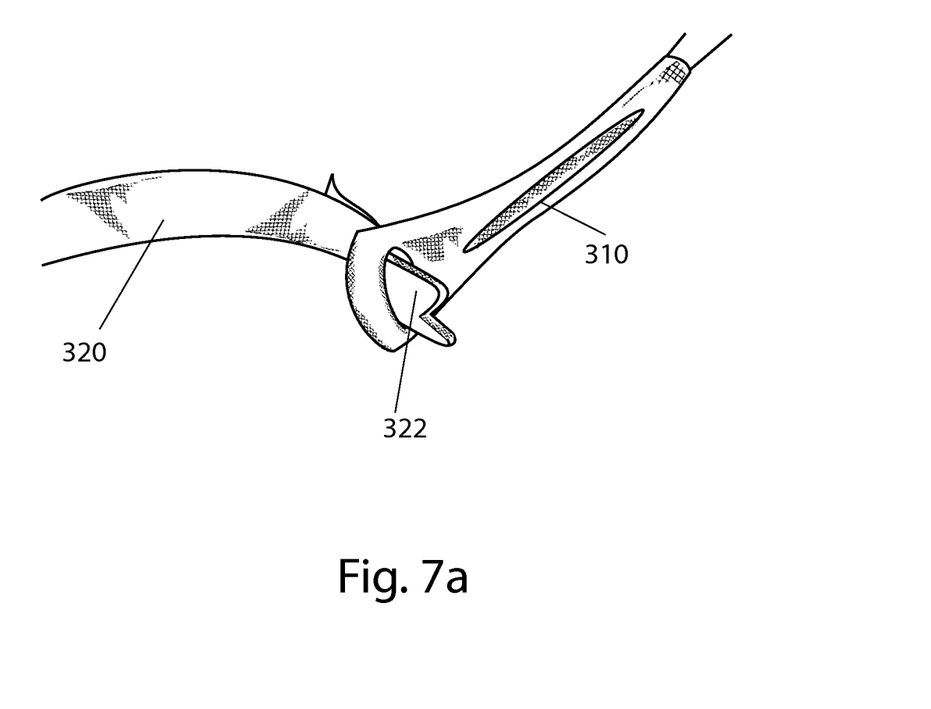
FIGS. 7a, 7b, and 8 show close-up views of an earstem and fastener of eyewear assembly from FIG. 3.
Figure 7B:
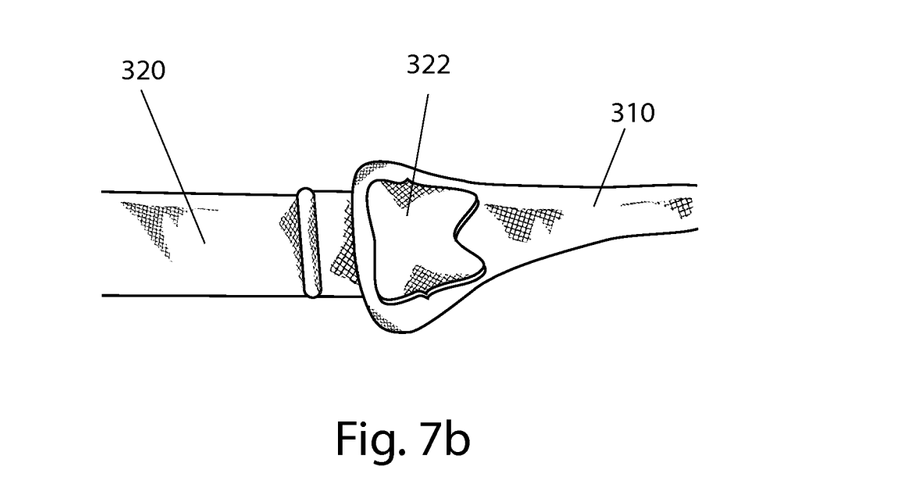

FIG. 7a shows fastener 322 partially inserted through receiving portion 335. In this manner, a user can insert fastener 322 into receiving portion 335 and push fastener 322 through the opening of receiving portion 335. Once fastener 322 has been completely pushed through receiving portion 335, fastener 322 can lay flat against earstem 310, as shown in FIG. 7b. The contour of the length of fastener 322 preferably matches the contour of earstem 310 such that fastener 322 and earstem 310 have a streamline design and appearance. In one embodiment, earstem 310 and fastener 322 are concave and have substantially similar curvature.

Once pushed through, the length of fastener 322 lays perpendicular to width 336, preventing fastener 322 from passing back through receiving portion 335. In this manner, strap 320 is securely fastened to sunglasses portion 301. As used herein, "securely fastened" means the strap remains fastened to the receiving portion when tensile forces are applied to the sunglasses and strap (e.g. the strap is pulled away from the earstem).

Fasteners 321 and 322 are sized and dimensioned such that they must be oriented in a specific manner before they can pass through receiving portions 335 and 340. Fasteners 321 and 322 are also configured to couple with band 324 such that the lengths of fasteners 321 and 322 prevent the fasteners from passing through the receiving portions when strap 320 is pulled in tension with sunglasses portion 301. One of ordinary skill in the art will recognize that other various geometries and configurations of fasteners and receiving portions can be utilized in a manner that is consistent with the inventive concepts taught herein.

Figure 8:
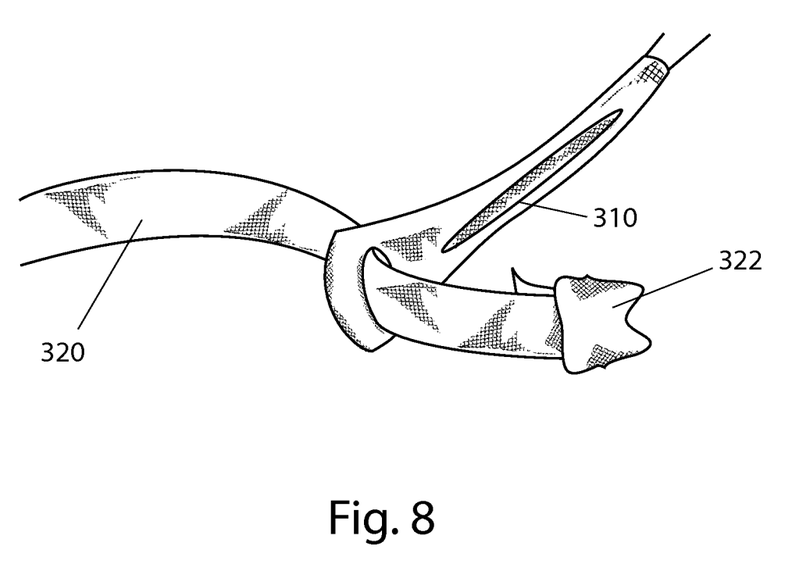

FIG. 8 shows how strap 320 can slide through receiving portion 335 even after fastener 322 has been "securely fastened" to receiving portion 335. This is dissimilar to the "rigid" prior art fasteners as shown in FIG. 2b, in which the fastener rigidly couples to a receiving portion.

Figure 9A:
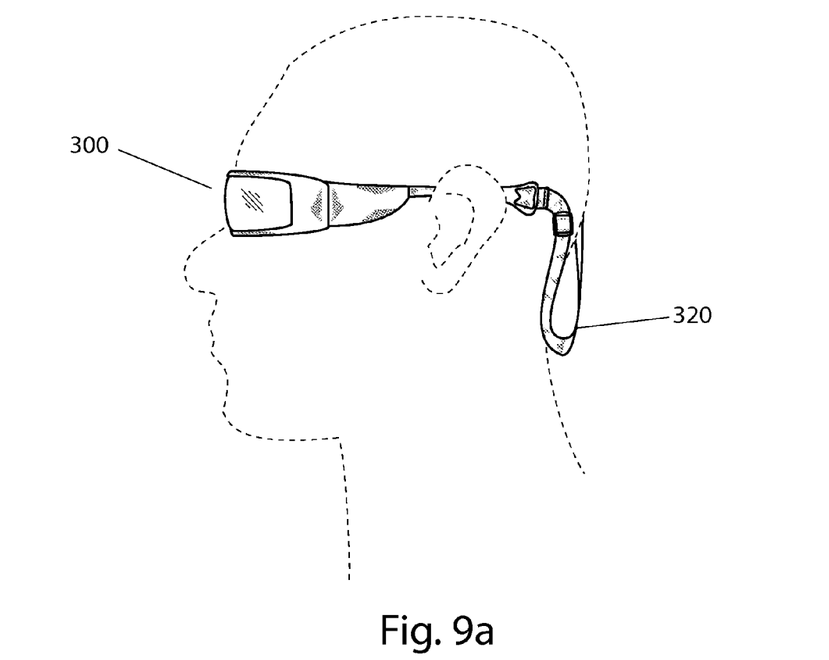
FIGS. 9a and 9b show the eyewear assembly of FIG. 3 being worn by a user.
Figure 9B:
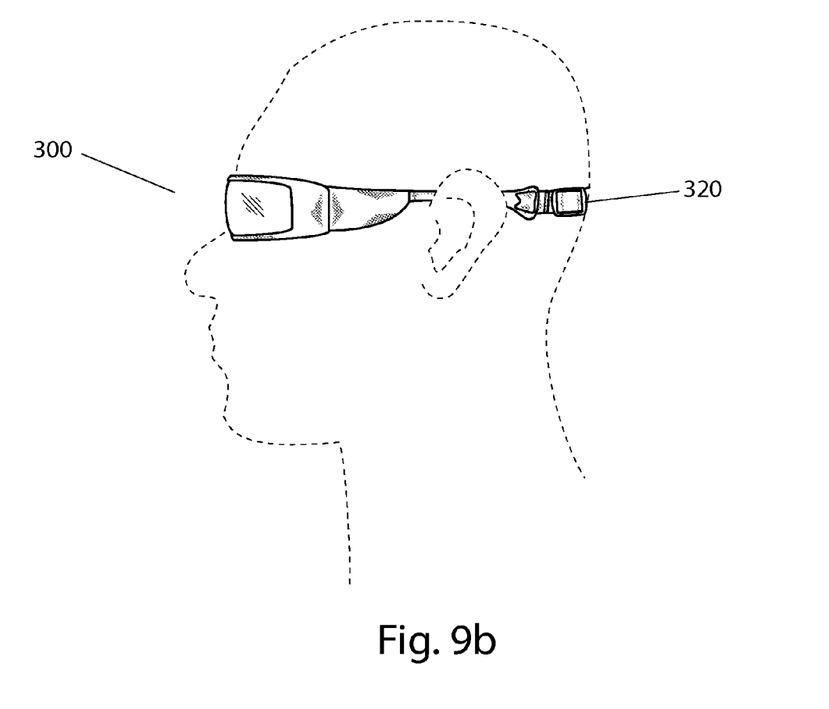

FIG. 9a shows eyewear assembly 300 being worn by a user in a "loose" fashion. The length of strap 320 has been elongated via adjuster 323 (see FIG. 6) such that strap 320 hangs down behind the user's neck in a loose configuration. It is further contemplated that strap 320 can be entirely removed from the sunglasses portion 301 and worn by the user in a "strapless" fashion. FIG. 9b shows eyewear assembly 300 being worn by a user in a "tightened" fashion. When worn in a tightened fashion, eyewear assembly 300 can be used during water sports and other activities in which external turbulent forces are applied to the eyewear assembly.

Figure 10:
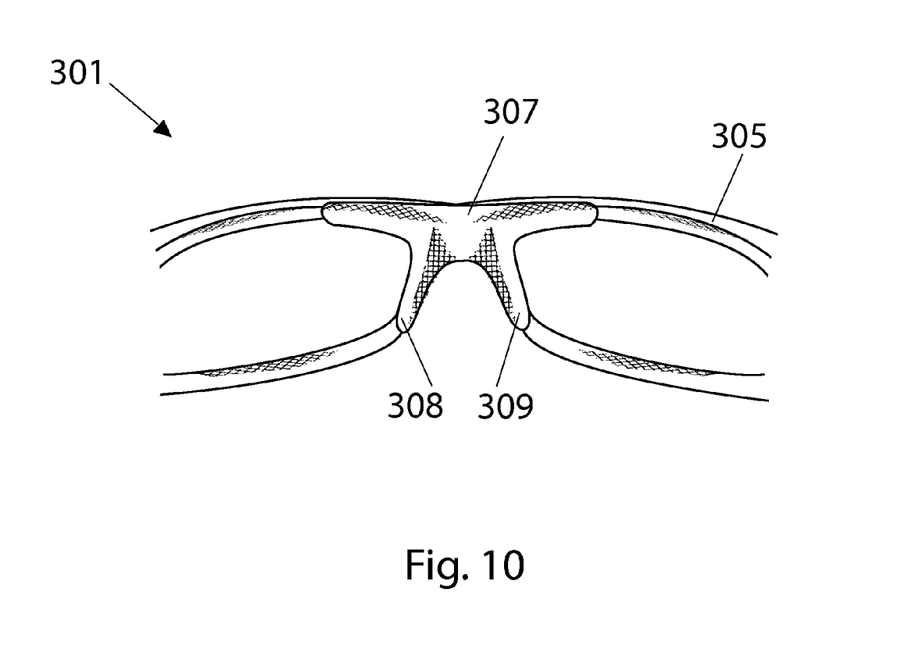
FIG. 10 is a close-up view of the nose bridge of the eyewear assembly of FIG. 3.

FIG. 10 shows a close-up back perspective view of frame 305, having a nose bridge 307. Nose bridge 307 has a first ridge 308 and a second ridge 309, which have been especially contoured to engage a portion of the eye sockets and sides of the nose of a user. The size and configuration of ridges 308 and 309 helps to reduce movement of sunglasses 301 when external forces are experienced during water sports. Nose bridge 307 is preferably made of a soft material, such as an elastomer, however all materials suitable for engaging the nose and eye sockets are contemplated.

The design of fasteners 321 and 322, and receiving portions 335 and 340, advantageously provide an eyewear assembly having an adjustable-length strap that can be securely and removeably fastened to the sunglasses portion 301, and wherein the eyewear has soft contact points such as nose bridge 307 and soft ends 325 and 330 for contacting the user's head. The non-elastic strap 320 avoids having a constant pressure to the head, eye sockets, and nose, and also reduces "play" in the eyewear assembly. The current state of the art in eyewear assemblies fails to provide eyewear with such combinations of features.

Figure 11:
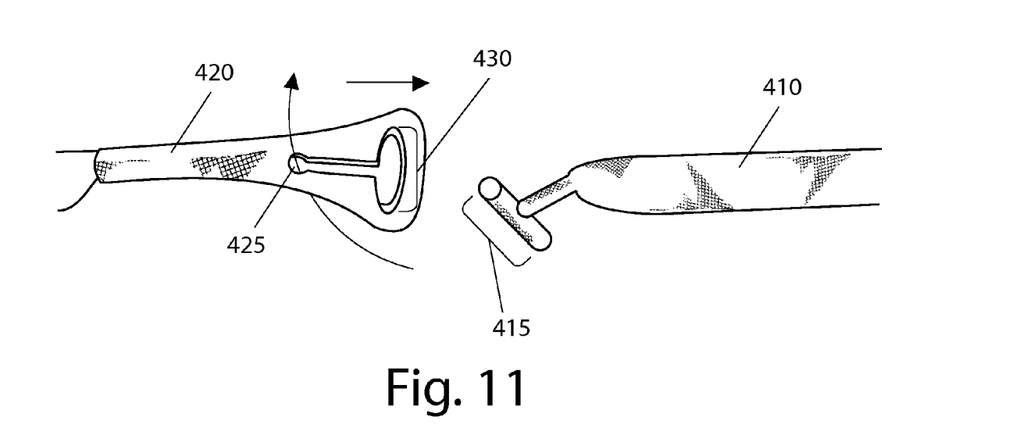
FIGS. 11-13 show various embodiments of fasteners and receiving portions for eyewear assemblies.
Figure 12:
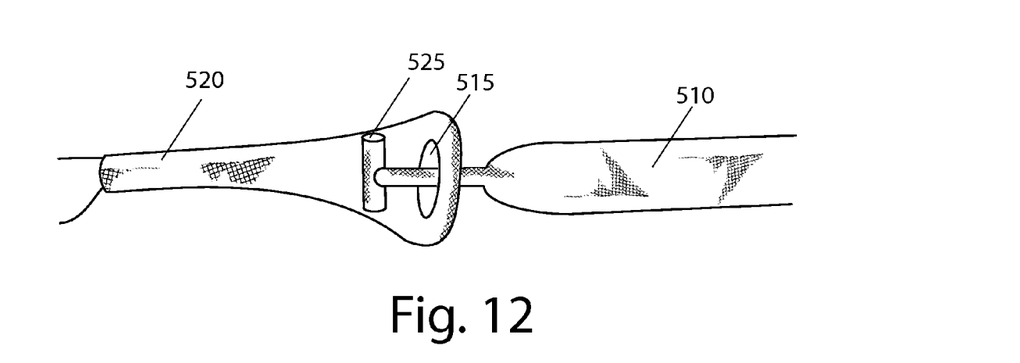
Figure 13:
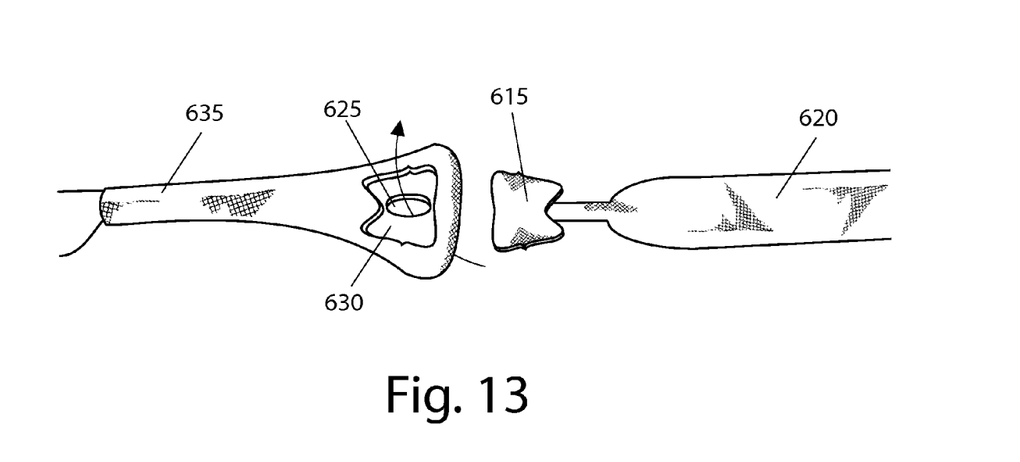

FIGS. 11-13 show other geometries and configurations for fasteners and receiving portions. In FIG. 11, strap 410 has a fastener 415 shaped generally as a cylinder. Earstem 420 has an opening 425 with a diameter substantially similar to the diameter of fastener 415. Fastener 415 can be pushed through opening 425 and snapped into receiving portion 430. The length of receiving portion 430 is substantially similar to the length of fastener 415.

In FIG. 12, strap 510 has a fastener 515, similar to the fastener 415 of FIG. 11. Earstem 520 has a receiving portion 525, which comprises a blind hole and a hollow channel within earstem 520. Fastener 515 can be inserted into receiving portion 525 and pulled into the channel towards the end of earstem 520, thus providing a secure and removeable fastener for strap 510.

In FIG. 13, strap 610 has a fastener 615, similar to the fastener 322 of FIG. 6. Fastener 615 can be pushed through opening 625 and can be positioned to lay flat within recess 630 of earstem 635. In this manner, strap 610 is securely and removeably attached to earstem 635.

The fasteners in FIGS. 11-13 generally have at least one dimension, and preferably two dimensions, that allow the fastener to pass through an opening in the earstem. The fasteners have a third dimension that prevents the fastener from passing back through the opening. The fasteners are attached to a strap such that the third dimension naturally opposes the dimensions of the opening, preventing the fastener from passing through the opening when the strap is pulled in tension with the earstem. The fastener must be oriented in a specific manner, and pushed through the opening by a user, in order to remove the strap from the receiving portion of the earstem. Other shapes, sizes, and configurations of fasteners and openings can be used in accordance with the inventive concepts taught herein. FIGS. 7a-7b and 11-13 are provided merely as non-limiting examples.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. An eyewear assembly for a user, comprising:
   a frame to hold a first lens;
   a first and second earstem coupled to the frame, wherein each earstem has a rigid portion and a soft end with a receiving portion; and
   a strap with a first and a second fastener, wherein each of the first and second fasteners securely attach to each of the receiving portion.

2. The eyewear assembly of claim 1, wherein the frame has a nose bridge that can mate with a nose of the user.

3. The eyewear assembly of claim 2, wherein the nose bridge comprises a soft material.

4. The eyewear assembly of claim 2, wherein the nose bridge has a first ridge and a second ridge configured to engage a first and second eye socket of the user, thereby reducing movement of the eyewear assembly with respect to a head and face of the user when an external force is applied to the eyewear assembly.

5. The eyewear assembly of claim 2, wherein the frame, nose bridge, and first and second earstems are configured to contact a head and face of the user such that a space exists between the face and the frame large enough to allow water to pass between the face and frame.

6. The eyewear assembly of claim 1, wherein the frame holds a second lens.

7. The eyewear assembly of claim 1, wherein the frame has at least one hole for air ventilation and to combat fogging.

8. The eyewear assembly of claim 1, wherein the soft end of the first and second earstem comprises an elastomer.

9. The eyewear assembly of claim 1, wherein the receiving portions of the first and second earstems comprise an opening for receiving the first and second fastener.

10. The eyewear assembly of claim 9, wherein the first and second fasteners are sized and dimensioned such that they can pass through the opening when positioned in a first orientation, and cannot pass through the opening when positioned in a second orientation.

11. The eyewear assembly of claim 1, wherein the strap is a non-elastic material.

12. The eyewear assembly of claim 1, wherein a length of the strap is adjustable.

13. A method of facilitating wearing eyewear during water sports, comprising:
   providing an eyewear assembly having a frame, two earstems, and a removeable strap, wherein the two earstems have a rigid portion and a soft end with a receiving portion for attaching fasteners on the strap; and
   instructing a user to attach the fasteners to the receiving portion and wear the eyewear.

* * * * *